Jan. 21, 1947.  P. G. CHEVIGNY  2,414,450
GASEOUS SPARK TUBE
Filed Nov. 20, 1942
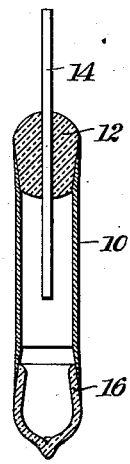
Fig: 1.
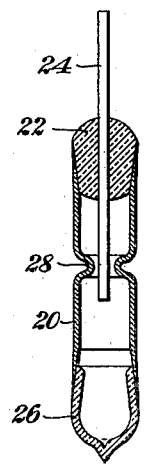
Fig: 2.
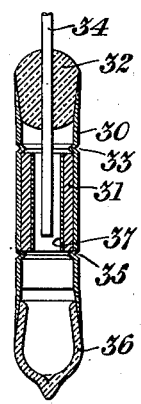
Fig: 3.
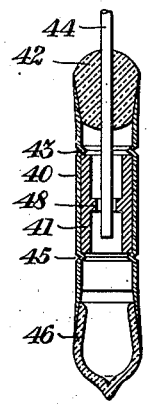
Fig: 4.
INVENTOR.
PAUL G. CHEVIGNY
BY
ATTORNEY Patented Jan. 21, 1947

2,414,450

UNITED STATES PATENT OFFICE 2,414,450

GASEOUS SPARK TUBE

Paul Georges Chevigny, New York, N. Y., assignor to Federal Telephone and Radio Corporation, Newark, N. J., a corporation of Delaware Application November 20, 1942, Serial No. 466,261

4 Claims. (Cl. 250—27.5)

This invention relates to improvements in gas discharge tubes, and more particularly to tubes so designed as to be extremely strong and highly shock-resistant.

In certain instances it is necessary to provide gas discharge tubes which are highly resistant to shock and highly accelerating forces. For example, if gas discharge tubes are to be mounted within electrically detonated shells, as disclosed in the fire control systems such as proposed by Edmond M. Deloraine in copending applications, Serial No. 388,036, filed April 11, 1941, and Serial No. 455,785, filed August 22, 1942, it is obvious that such tubes must be able to withstand every shock and high acceleration forces. It is the primary object of this invention to provide small gas discharge tubes having the necessary strength and rigidity for this purpose.

A consequent object of this invention is to provide a gas discharge tube in which the glass parts are subjected almost solely to compressive stresses at which the glass is most resistant.

A further object of this invention is to provide a gas discharge tube which operates within very accurate limits of voltage.

These and other objects and advantages of the present invention will appear from the following description of a preferred construction of gas discharge tubes and several modifications thereof, illustrated in the accompanying drawing in which:

Fig. 1 is a vertical longitudinal section of a simple improved gas discharge tube formed in accordance with the present invention;

Fig. 2 is a vertical section of a slightly modified form of tube;

Fig. 3 is a vertical section of a still further modified form of tube; and

Fig. 4 is a vertical section of a fourth modification.

In its simplest form, the tube illustrated in Fig. 1 consists of a copper sleeve 10, into one end of which is inserted a bead, such as a glass bead 12, which at the same time supports a centrally positioned electrode 14. After the tube is filled with a suitable inert gas such, for example, as neon, argon, helium, krypton, or the like, the lower end of the sleeve is sealed, as by glass seal 16. With this form of tube, it has been found that if the tube is mounted so that the forces to which it is subjected are in the direction of the sleeve axis, the glass parts are submitted almost entirely to compressive stresses, to which the glass is most resistant.

In the preferred form of invention the copper sleeve 10 is polished, for example, electrolytically, to obtain an absolutely bright surface, and the inner end of the electrode 14 may also be electrolytically polished copper. In forming the tube, nitrogen may be flowed inside the tube during the sealing operation to prevent oxidation of the parts and spoiling of the polish. By properly proportioning the gases within the tube, either using one gas alone or a mixture of several gases, and by maintaining certain gas pressures, the sparking voltage of the tube can be held within accurate limits and will be more or less independent of the temperature of the tube. To assist in starting the tube without delay, it is also advisable to pre-ionize the gases slightly, and for this purpose a small coating of some radioactive salt may be placed at any point within the tube.

The discharge voltage of the tube may be varied by changing the distance between the electrodes. One manner of doing this is illustrated in Fig. 2 showing a slightly modified form of tube having a copper sleeve 20 sealed at one end with a bead 22 supporting the centrally positioned electrode 24, and provided with a suitable seal 26 at the other end. In this case, the copper sleeve 20 is bent inwardly substantially at its center to form an integral inwardly extending ring 28 which is spaced from and closely about the electrode 24. In all other respects, however, the tube illustrated in Fig. 2 can be constructed in the manner described above in connection with the tube shown in Fig. 1.

In Fig. 3, I have illustrated a tube provided with a second sleeve mounted within the outer copper sleeve. As there shown, the outer copper sleeve 30 is again provided with a bead 32 at one end, which seals this end and supports a centrally positioned electrode 34. Within the sleeve 30 is positioned a second sleeve 31 which may be held in place in the longitudinal direction by inwardly crimping the outer sleeve 30 to form integral rings 33 and 35 at opposite ends of the internal sleeve 31. The lower end of the sleeve 30 is again sealed by a glass seal 36. The internal sleeve 31 may be formed of a metal other than copper such, for example, as iron, nickel, tungsten, molybdenum or tantalum, while the central electrode 34 might also be made of one of these metals. Additionally, if desired, the inner surface of the sleeve 31 might be coated with a suitable emissive mixture, shown at 37. As an example of suitable emissive mixtures barium azide, barium carbonate and the like are suggested. The use of an inner sleeve, such as illustrated in Fig. 3, is only necessary when a metal different from copper is desired to be used as one of the electrodes.

The modified form of tube illustrated in Fig. 4 combines the features of the tubes illustrated in Figs. 2 and 3, namely the provision of an internal sleeve, where an electrode other than copper is desired, and also provides an arrangement for decreasing the space between the two electrodes. The tube illustrated in Fig. 4 comprises essentially an outer copper sleeve 40 sealed at one end with a bead 42 supporting the electrode 44. The inner sleeve 41 may again be held in place by suitable indentations 43 and 45 formed in the outer sleeve 40. The lower end of the sleeve 40 is provided with a suitable glass seal 46. The inner sleeve 41 is, in this case, formed with an integral inwardly extending ring 48 closely spaced about the centrally positioned electrode 44. The inner ring 41 may be coated, if desired, as described in connection with the inner ring of Fig. 3.

While I have described above the principles of my invention in connection with certain specific forms of tubes, it is to be clearly understood that this description is made only by way of example and not as a limitation on the scope of my invention as set forth in the objects of the accompanying claims.

What is claimed is:

1. A closed gas-filled spark tube comprising a thin copper sleeve, an electrode projecting centrally into the sleeve from one end, a second sleeve of a different metal attached to and mounted within the copper sleeve about the electrode, an insulating bead inserted in and closing one end of the tube and supporting said electrode, a glass seal inserted in and closing the other end of the tube, and an inert gas within the tube.

2. A closed gas-filled spark tube comprising a thin copper sleeve, an electrode projecting centrally into the sleeve from one end, an insulating bead inserted in and closing one end of the tube and supporting said electrode, a second sleeve mounted within the copper sleeve about the electrode, said second sleeve being shorter than the copper sleeve, said copper sleeve being formed with integral extending projections about each end of the second sleeve for longitudinally positioning the same, a glass seal inserted in and closing the other end of the tube, and an inert gas within the tube.

3. A closed gas-filled spark tube comprising a thin copper sleeve, an electrode projecting centrally into the sleeve from one end, an insulating bead inserted in and closing one end of the tube and supporting said electrode, a second sleeve attached to and mounted within the copper sleeve about the electrode, an emissive coating on said second sleeve, a glass seal inserted in and closing the other end of the tube and an inert gas within the tube.

4. A closed gas-filled spark tube comprising a thin copper sleeve, an electrode projecting centrally into the sleeve from one end, an insulating bead inserted in and closing one end of the tube and supporting said electrode, a second sleeve attached to and mounted within the copper sleeve, said second sleeve being formed with a narrow integral internally projecting ring spaced from and about the centrally positioned electrode, a glass seal inserted in and closing the other end of the tube, and an inert gas within the tube.

PAUL GEORGES CHEVIGNY.